(12) United States Patent
Franca-Neto et al.

(10) Patent No.: US 11,783,176 B2
(45) Date of Patent: Oct. 10, 2023

(54) ENHANCED STORAGE DEVICE MEMORY ARCHITECTURE FOR MACHINE LEARNING

(71) Applicant: Western Digital Technologies, Inc., San Jose, CA (US)

(72) Inventors: Luiz M. Franca-Neto, Sunnyvale, CA (US); Viacheslav Dubeyko, San Jose, CA (US)

( * ) Notice: Subject to any disclaimer, the term of this patent is extended or adjusted under 35 U.S.C. 154(b) by 962 days.

(21) Appl. No.: 16/363,744

(22) Filed: Mar. 25, 2019

(65) Prior Publication Data

US 2020/0311537 A1    Oct. 1, 2020

(51) Int. Cl.
*G06N 3/08* (2023.01)
*G06F 12/02* (2006.01)

(52) U.S. Cl.
CPC .......... *G06N 3/08* (2013.01); *G06F 12/023* (2013.01); *G06F 2212/251* (2013.01)

(58) Field of Classification Search
CPC .... G06N 3/08; G06F 12/023; G06F 2212/251
USPC ............................................ 706/19; 711/103
See application file for complete search history.

(56) References Cited

U.S. PATENT DOCUMENTS

| | | | |
|---|---|---|---|
| 3,602,186 A | 8/1971 | Popenoe | |
| 5,091,864 A | 2/1992 | Baji et al. | |
| 5,138,695 A | 8/1992 | Means et al. | |
| 5,208,900 A | 5/1993 | Gardner | |
| 5,226,092 A | 7/1993 | Chen | |
| 5,337,395 A | 8/1994 | Vassiliadis | |
| 5,509,106 A | 4/1996 | Pechanek et al. | |
| 5,519,811 A | 5/1996 | Yoneda et al. | |
| 5,627,943 A | 5/1997 | Yoneda et al. | |
| 5,659,781 A | 8/1997 | Larson | |
| 5,799,134 A | 8/1998 | Chiueh et al. | |
| 5,812,993 A | 9/1998 | Ginosar et al. | |
| 7,085,749 B2 | 8/2006 | Matsugu | |
| 7,437,339 B2 | 10/2008 | Matsugu | |
| 7,489,834 B2 | 2/2009 | Kloth | |
| 7,564,996 B2 | 7/2009 | Kloth | |
| 7,743,004 B2 | 6/2010 | Matsugu | |
| 7,774,313 B1 * | 8/2010 | Nachenberg | G06F 11/1471 707/694 |

(Continued)

FOREIGN PATENT DOCUMENTS

| | | | |
|---|---|---|---|
| AU | 197131902 A | 2/1973 | |
| BE | 771045 A | 12/1973 | |

(Continued)

OTHER PUBLICATIONS

Ogunmolu et al.; "Nonlinear Systems Identification Using Deep Dynamic Neural Networks"; Oct. 2016; available at: https://www.researchgate.net/publication/308896333_Nonlinear_Systems_Identification_Using_Deep_Dynamic_Neural_Networks.

(Continued)

*Primary Examiner* — Gautam Sain
(74) *Attorney, Agent, or Firm* — Barry IP Law, P.C.

(57) ABSTRACT

Embodiments of storage device architecture for processing data using machine learning are disclosed. In some embodiments, the storage device includes a separate I/O core and a neural network core. The storage device can create a copy of data streams in which the data is stored, and the neural network core can process the copy of the data streams in a neural network while the I/O core can perform read or write functions on the data streams.

19 Claims, 10 Drawing Sheets

(56) References Cited

U.S. PATENT DOCUMENTS

| | | | |
|---|---|---|---|
| 8,392,683 B1* | 3/2013 | Confalonieri | G06F 12/0246 |
| | | | 711/163 |
| 8,724,624 B2 | 5/2014 | Bazlamacci et al. | |
| 8,824,603 B1 | 9/2014 | Ge et al. | |
| 9,646,243 B1 | 5/2017 | Gokmen | |
| 9,665,799 B1 | 5/2017 | Munteanu et al. | |
| 9,697,463 B2 | 7/2017 | Ross et al. | |
| 9,710,748 B2 | 7/2017 | Ross et al. | |
| 9,721,203 B1 | 8/2017 | Young et al. | |
| 9,747,548 B2 | 8/2017 | Ross et al. | |
| 9,805,303 B2 | 10/2017 | Ross et al. | |
| 9,928,460 B1 | 3/2018 | Nowatzyk et al. | |
| 9,959,500 B1 | 5/2018 | Torng et al. | |
| 10,019,668 B1 | 7/2018 | Woo | |
| 10,043,095 B2 | 8/2018 | Yang et al. | |
| 10,074,051 B2 | 9/2018 | Thorson et al. | |
| 10,083,171 B1 | 9/2018 | Yang et al. | |
| 10,083,395 B2 | 9/2018 | Young | |
| 10,102,453 B1 | 10/2018 | Yang et al. | |
| 10,459,849 B1* | 10/2019 | Shorb | G06F 11/2041 |
| 10,521,488 B1 | 12/2019 | Ross et al. | |
| 10,790,828 B1 | 9/2020 | Gunter et al. | |
| 10,817,802 B2 | 10/2020 | Bruestle et al. | |
| 2003/0004907 A1 | 1/2003 | Matsugu | |
| 2004/0156546 A1 | 8/2004 | Kloth | |
| 2004/0156547 A1 | 8/2004 | Kloth | |
| 2007/0011120 A1 | 1/2007 | Matsugu | |
| 2008/0270335 A1 | 10/2008 | Matsugu | |
| 2011/0029471 A1 | 2/2011 | Chakradhar et al. | |
| 2012/0257506 A1 | 10/2012 | Bazlamacci et al. | |
| 2014/0214766 A1* | 7/2014 | Kato | G06F 11/1471 |
| | | | 707/640 |
| 2014/0270494 A1 | 9/2014 | Sawhney et al. | |
| 2014/0289445 A1 | 9/2014 | Savich | |
| 2015/0006444 A1 | 1/2015 | Tamatsu et al. | |
| 2015/0112911 A1 | 4/2015 | Jackson et al. | |
| 2015/0170021 A1 | 6/2015 | Upon et al. | |
| 2015/0178246 A1 | 6/2015 | Abellanas et al. | |
| 2016/0142731 A1 | 5/2016 | Nakagami et al. | |
| 2016/0210550 A1 | 7/2016 | Merrill et al. | |
| 2016/0342889 A1 | 11/2016 | Thorson et al. | |
| 2016/0342893 A1 | 11/2016 | Ross et al. | |
| 2016/0371496 A1* | 12/2016 | Sell | G06F 21/604 |
| 2017/0103313 A1 | 4/2017 | Ross et al. | |
| 2017/0103314 A1 | 4/2017 | Ross | |
| 2017/0103318 A1 | 4/2017 | Ross et al. | |
| 2017/0147942 A1* | 5/2017 | Gao | G06N 7/005 |
| 2018/0005115 A1 | 1/2018 | Gokmen et al. | |
| 2018/0032835 A1 | 2/2018 | Shirahata | |
| 2018/0075350 A1 | 3/2018 | Gokmen | |
| 2018/0101743 A1 | 4/2018 | Yang et al. | |
| 2018/0101747 A1 | 4/2018 | Yang et al. | |
| 2018/0101748 A1 | 4/2018 | Yang et al. | |
| 2018/0107921 A1 | 4/2018 | Ross et al. | |
| 2018/0129936 A1 | 5/2018 | Young et al. | |
| 2018/0157465 A1 | 6/2018 | Bittner et al. | |
| 2018/0157940 A1 | 6/2018 | Yang et al. | |
| 2018/0165577 A1 | 6/2018 | Young et al. | |
| 2018/0173441 A1* | 6/2018 | Cargnini | G06F 3/0659 |
| 2018/0174031 A1 | 6/2018 | Yang et al. | |
| 2018/0189595 A1 | 7/2018 | Yang et al. | |
| 2018/0189642 A1 | 7/2018 | Boesch et al. | |
| 2018/0189648 A1 | 7/2018 | Sengupta et al. | |
| 2018/0247113 A1 | 8/2018 | Yang et al. | |
| 2018/0268234 A1 | 9/2018 | Yang et al. | |
| 2018/0285005 A1 | 10/2018 | Torng et al. | |
| 2018/0285006 A1 | 10/2018 | Torng et al. | |
| 2018/0285713 A1 | 10/2018 | Torng et al. | |
| 2018/0285714 A1 | 10/2018 | Torng et al. | |
| 2018/0285720 A1 | 10/2018 | Torng et al. | |
| 2018/0285722 A1 | 10/2018 | Torng et al. | |
| 2018/0285723 A1 | 10/2018 | Torng et al. | |
| 2018/0307438 A1 | 10/2018 | Huang et al. | |
| 2018/0307980 A1 | 10/2018 | Barik et al. | |
| 2018/0309050 A1 | 10/2018 | Torng et al. | |
| 2018/0314671 A1 | 11/2018 | Zhang et al. | |
| 2018/0336164 A1 | 11/2018 | Phelps et al. | |
| 2018/0341621 A1 | 11/2018 | Park et al. | |
| 2019/0042918 A1 | 2/2019 | Meyer et al. | |
| 2019/0043203 A1 | 2/2019 | Fleishman et al. | |
| 2019/0073259 A1 | 3/2019 | Qin et al. | |
| 2019/0114499 A1 | 4/2019 | Delaye et al. | |
| 2019/0114548 A1 | 4/2019 | Wu et al. | |
| 2019/0121889 A1* | 4/2019 | Gold | G06F 16/2255 |
| 2019/0156187 A1 | 5/2019 | Dasari et al. | |
| 2019/0179795 A1 | 6/2019 | Huang et al. | |
| 2019/0236049 A1 | 8/2019 | Vantrease et al. | |
| 2019/0317901 A1 | 10/2019 | Kachare et al. | |
| 2020/0073726 A1 | 3/2020 | Lee et al. | |
| 2020/0127685 A1* | 4/2020 | Chen | G11C 29/52 |
| 2020/0133531 A1 | 4/2020 | Subramaniam et al. | |
| 2020/0134462 A1 | 4/2020 | Gupta et al. | |
| 2020/0293866 A1* | 9/2020 | Guo | G06F 16/9024 |
| 2020/0327367 A1 | 10/2020 | Ma et al. | |
| 2020/0387798 A1 | 12/2020 | Newage et al. | |

FOREIGN PATENT DOCUMENTS

| | | |
|---|---|---|
| CA | 930619 A1 | 7/1973 |
| DE | 2139302 C3 | 10/1978 |
| EP | 3373210 A1 | 9/2018 |
| ES | 196704 Y | 8/1975 |
| FR | 2104032 A5 | 4/1972 |
| GB | 1316899 A | 5/1973 |
| IL | 37434 A | 1/1974 |
| KR | 197900473 B1 | 5/1979 |
| SE | 361090 B | 10/1973 |
| WO | 2017006512 A1 | 1/2017 |
| WO | 2019075267 A1 | 4/2019 |

OTHER PUBLICATIONS

Ogunmolu et al.; "Nonlinear Systems Identification Using Deep Dynamic Neural Networks"; in arXiv preprint arXiv: 1610.01439; Oct. 5, 2016.

Lu et al.; "FlexFlow: a Flexible Dataflow Accelerator Architecture for Convolutional Neural Networks"; 2017 IEEE International Symposium on High Performance Computer Architecture (HPCA); 2017; pp. 553-564; available at: https://ieeexplore.ieee.org/document/7920855.

Qi et al.; "FPGA design of a multicore neuromorphic processing system"; NAECON 2014; IEEE National Aerospace and Electronics Conference; 2014; pp. 255-258; available at: https://ieeexplore.ieee.org/abstract/document/7045812.

Shafiee et al; "ISAAC: a Convolutional Neural Network Accelerator with in-Situ Analog Arithmetic in Crossbars"; In Proceedings of the 43rd ICSA; pp. 14-26; IEEE press Year: 2016; available at: https://ieeexplore.ieee.org/document/7551379.

Chi et al.; "PRIME: a Novel Processing-in-memory Architecture for Neural Network"; Jun. 2016; available at https://dl.acm.org/doi/10.1145/3007787.3001140.

Girones et al.; "Systolic Implementation of a Pipelined on-Line Backpropagation"; Sep. 1999; available at: https://ieeexplore.ieee.org/document/758891.

International Search Report and Written Opinion from International Application No. PCT/US2018/066593, dated Mar. 29, 2019, 11 pages.

International Search Report and Written Opinion from International Application No. PCT/US2018/066917, dated Mar. 29, 2019, 11 pages.

Mahapatra et al.; "Mapping of Neural Network Models onto Systolic Arrays", Journal of Parallel and Distributed Computing, vol. 60, Issue 6, Jun. 2000, pp. 677-689; available at: https://www.sciencedirect.com/science/article/abs/pii/S0743731500916344.

Pending U.S. Appl. No. 15/981,679, filed May 16, 2018, entitled "Systolic Neural Network Engine With Crossover Connection Optimization", Luiz M. Franca-Neto.

Pending U.S. Appl. No. 16/363,661, filed Mar. 25, 2019, entitled "Enhanced Memory Device Architecture for Machine Learning", Luiz M. Franca-Neto.

(56) References Cited

OTHER PUBLICATIONS

Chen et al., "Eyeriss: a Spatial Architecture for Energy-Efficient Dataflow for Convolutional Neural Networks", 2016, 2016 ACM/IEEE 43rd Annual International Symposium on Computer Architecture (ISCA), pp. 367-379, doi: 10.1109/ISCA.2016.40. (Year 2016).
Gokmen et al., "Training Deep Convolutional Neural Networks with Resistive Cross-Point Devices", Oct. 10, 2017, Front. Neurosci. 11 :538. doi: 10.3389/fnins.2017.00538 (Year: 2017).
James E. Smith, "Decoupled Access/Execute Computer Architectures", Apr. 1982, SIGARCH Comput. Archit. News 10, 3 (Apr. 1982), 112-119. DOI:https://doi.org/10.1145/1067649.801719(Year: 1982).
Jones et al., "Learning in Linear Systolic Neural Network Engines: Analysis and Implementation", Jul. 1994, IEEE Transactions on Neural Networks, vol. 5, No. 4, p. 584-593(Year: 1994).
Norman P. Jouppi, Cliff Young, Nishant Patil, David Patterson, et al., "In-Datacenter Performance Analysis of a Tensor Processing Unit", Jun. 24-28, 2017, In Proceedings of ISCA'17, 12 pages. (Year: 2017).
Du et al.; "A Reconfigurable Streaming Deep Convolutional Neural Network Accelerator for Internet of Things"; in IEEE Transactions on Circuits and Systems I: Regular Papers, vol. 65, No. 1, pp. 198-208; Jan. 2018; available at: https://.ieeexplore.ieee.org/document/8011462.
U.S. Appl. No. 16/234,184, filed Dec. 27, 2018, Franca-Neto.
U.S. Appl. No. 16/233,876, filed Dec. 27, 2018, Franca-Neto.
U.S. Appl. No. 15/981,624, filed May 16, 2018, Franca-Neto.
U.S. Appl. No. 16/233,968, filed Dec. 27, 2018, Franca-Neto.
U.S. Appl. No. 16/234,166, filed Dec. 27, 2018, Franca-Neto.
U.S. Appl. No. 15/981,664, filed May 16, 2018, Franca-Neto.
U.S. Appl. No. 15/981,719, filed May 16, 2018, Franca-Neto.
U.S. Appl. No. 15/981,711, filed May 16, 2018, Franca-Neto.
U.S. Appl. No. 15/981,735, filed May 16, 2018, Franca-Neto.
Parhami et al.; "Periodically Regular Chordal Rings"; IEEE Transactions on Parallel and Distributed Systems; vol. 10, No. 6; Jun. 1999; available at: https://ieeexplore.ieee.org/document/774913.

\* cited by examiner

ENHANCED STORAGE DEVICE MEMORY ARCHITECTURE FOR MACHINE LEARNING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to storage device architecture, and more particularly, to data processing inside of the storage device via machine learning.

BACKGROUND

Machine learning techniques, such as neural networks, are frequently being utilized by modern computing systems. These technologies can operate on large data sets and thus can require large amounts of storage space. However, current memory architectures do not allow for scalability of big data analysis. The present disclosure addresses these and other problems.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Various embodiments of this disclosure provide a data storage device configured to perform neural network computations, the device comprising: a non-volatile memory comprising a first memory region configured to store data provided by a host system and a second memory region configured to store data related to neural network computations; a controller configured to: store data in the first memory region and retrieve data from the first memory region in response to at least one data transfer command received from the host system; and perform neural network computations in the second memory region.

In the data storage device of the preceding paragraph or any paragraphs herein, the second memory region can be configured to store a plurality of memory streams, each stream including a contiguous set of physical memory storage units of the non-volatile memory, and the controller can be further configured to perform neural network computations on the plurality of memory streams.

In the data storage device of the preceding paragraph or any paragraphs herein, the controller can be further configured to identify each memory stream of the plurality of memory streams by a common identifier.

In the data storage device of the preceding paragraph or any paragraphs herein, the plurality of memory streams can comprise a first memory stream and a second memory stream.

In the data storage device of the preceding paragraph or any paragraphs herein, the controller can be further configured to store input data for neural network computations in at least one memory stream of the plurality of memory stream.

In the data storage device of the preceding paragraph or any paragraphs herein, the plurality of memory streams can comprise at least one input memory stream and at least one output memory stream, and wherein the controller can be further configured to perform neural network computations on data stored in the at least one input memory stream and store a result of the neural network computations in the at least one output memory stream.

In the data storage device of the preceding paragraph or any paragraphs herein, the controller can be further configured to receive from the at least one output memory stream the result of the neural network computations and provide the result to the host system.

In the data storage device of the preceding paragraph or any paragraphs herein, the controller can comprise a plurality of processor cores configured to process a plurality of memory streams substantially concurrently.

In the data storage device of the preceding paragraph or any paragraphs herein, the controller can include an I/O core, and the device can further comprise another controller that includes a neural network core. The I/O core can be responsible for performing I/O operations on data, while the neural network core can be separately responsible for performing neural network computations.

Various embodiments of this disclosure provide a method for performing neural network computations within a data storage device, the method comprising, by a controller of the data storage device: receiving, from a host system, a first request to perform analysis of data stored in a memory region of a non-volatile memory of the data storage device;

locking the memory region of the non-volatile memory; copying of the memory region of the non-volatile memory; unlocking the memory region of the non-volatile memory; and initiating processing of the data by applying a neural network on the copied data.

In the method of the preceding paragraph or any paragraphs herein, the neural network can include a systolic flow engine.

In the method of the preceding paragraph or any paragraphs herein, neural network parameters can be stored in the non-volatile memory, and the processing of the data via the neural network can occur within the data storage device.

The method of the preceding paragraph or any paragraphs herein can further comprise, by the processor: receiving, from the host system, a second request to perform an operation on data stored in the memory region of the non-volatile memory; and in response to determining that the memory region is locked, storing the second request in a journal until the memory region becomes unlocked.

In the method of the preceding paragraph or any paragraphs herein, the operation can include a write operation.

The method of the preceding paragraph or any paragraphs herein can further comprise, by the processor: in response to determining that processing of the data via the neural network has been completed, deleting the copy of the memory region.

Various embodiments of this disclosure provide a data storage device configured to perform neural network computations, the device comprising: a non-volatile memory comprising a first memory region configured to store data provided by a host system and a second memory region configured to store data related to neural network computations; a first controller configured to: receive, from the host system, a first request to perform analysis of data stored in the first memory region; set a locked state for the first memory region; copy the data stored in the first memory region into the second memory region; set an unlocked state for the first memory region; and perform neural network computations on the copy of the data stored in the second memory region; and a second controller configured to: receive, from the host system, a second request to perform an operation on data stored in the first memory region; in response to determining that the first memory region is in an unlocked state, perform the operation; and in response to determining that the first memory region is in a locked state, storing the second request in a journal; and perform neural network computations on the copy of the data stored in the second memory region.

In the data storage device of the preceding paragraph or any paragraphs herein, the journal can prevent writing to the first memory portion.

In the data storage device of the preceding paragraph or any paragraphs herein, the first controller can be further configured to: receive a second request to perform analysis of data stored in the first memory region while the first memory region is in a locked state and copy the data stored in the first memory region into a third memory region without waiting for the first memory region to be in an unlocked state.

In the data storage device of the preceding paragraph or any paragraphs herein, the first controller can be further configured to retrieve from an output memory stream the result of the neural network computations and provide the result to the host system, the output memory stream comprising a contiguous set of physical memory storage units of the second memory portion of the non-volatile memory.

In the data storage device of the preceding paragraph or any paragraphs herein, the first controller can comprise a plurality of processing cores configured to process a plurality of memory streams substantially concurrently.

Overview

Traditional memory architectures, such as the architecture found in non-volatile memory (NVM), magnetic random-access memory (MRAM), resistive random-access memory (Re RAM), nantero random-access memory (NRAM), and/or the like, can have low latency properties, providing opportunities to increase performance of computer systems dramatically. However, these traditional memory architectures are unable to efficiently take advantage of the non-volatile memory. Traditional memory architectures suffer from critical drawbacks, in particular if some data is not pre-fetched into the page cache, then persistent data is transferred to the dynamic random-access memory (DRAM) from persistent storage when some data is processed.

Figure 1A:
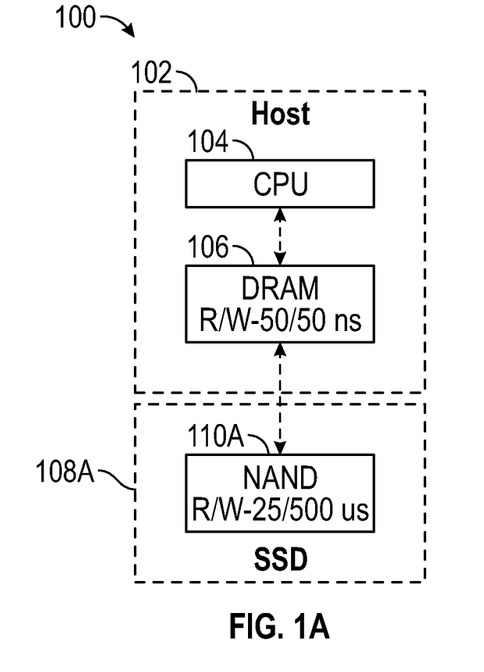
FIGS. 1A and 1B are examples of persistent data transferred between DRAM and persistent storage according to the prior art.
Figure 1B:
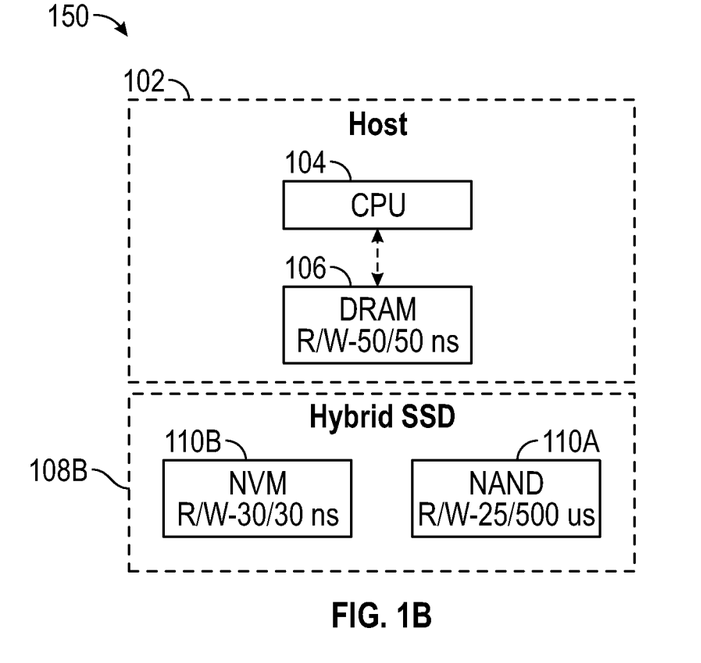

FIGS. 1A and 1B are examples 100 and 150 of persistent data transferred between DRAM and persistent storage. The host 102 can include a CPU 104 and DRAM 106. The interface circuitry for the DRAM 106 communicates with the interface circuitry for the persistent storage, such as the solid state drive (SSD) 108A or a hybrid SSD 108B, for each data that has to be processed. The SSD 108A can include a NAND flash memory 110A. The hybrid SSD 108B can include a NAND flash memory 110A and a non-volatile memory (NVM) 110B.

Figure 2:
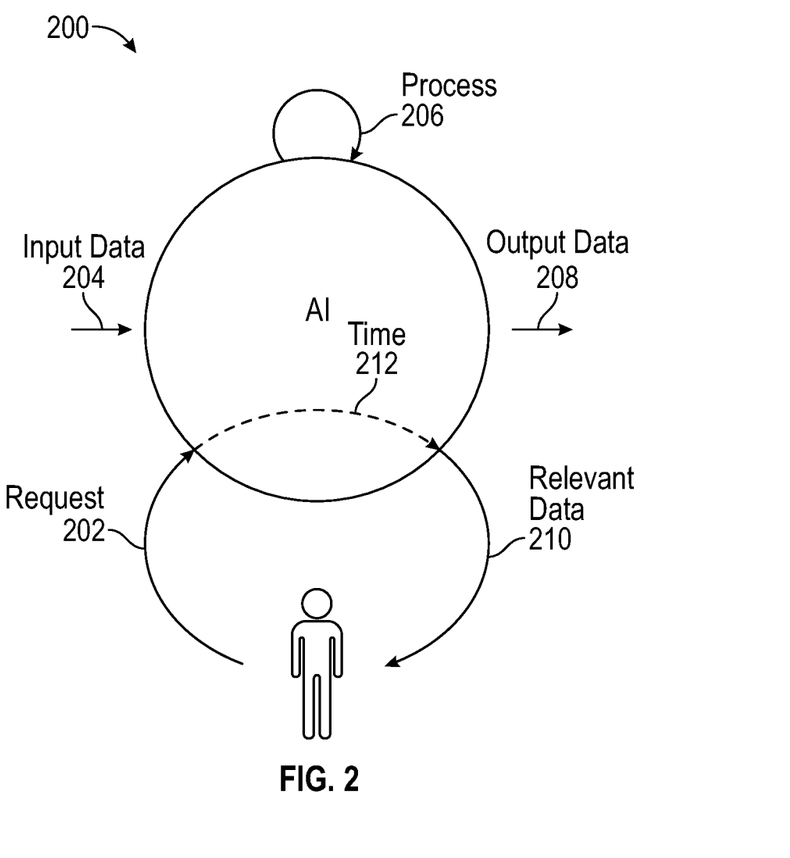
FIG. 2 is an example of analyzing data through artificial intelligence models according to the prior art.

FIG. 2 is an example 200 of analyzing data through artificial intelligence models. In step 202, a host can request analysis of data. The data can be inputted into an artificial intelligence model 204, the data 206 can be processed via the artificial intelligence model, and the data 208 outputted. Then, the user 210 can receive the outputted data. In existing technology, the memory device is typically waiting on receiving the output data and can be wasting time 212 and resources that could have otherwise been used to perform other operations.

Furthermore, current memory chip architectures do not allow for scalability of big data analysis. With such architectures, large amounts of data would have to be transferred to and from the DRAM and the persistent storage devices. As such, simply increasing the number of cores for increased data processing does not address the issues described herein. For example, the storage device may have to copy data to a host side, and the host side may have to process the data. Then, one set of data needs to be copied in DRAM, the CPUs would process the set of data, and the next set of data would then be copied again for processing. This creates a large bottleneck for performance and cannot scale for large data processing. As such, the data processing would take a large amount of time and resource. Moreover, this would result in large overhead in the software stack. Furthermore, with separate CPU cores, each CPU can be dedicated to a subset of data such as modifying the subset of data, resulting in an inconsistent state of data across the CPUs. Moreover, increasing size of the DRAM also comes with inefficiencies, such as an increase in power consumption. Furthermore, the CPU may not be able to address a DRAM over a certain size, and thus the DRAM is not scalable.

Figure 3:
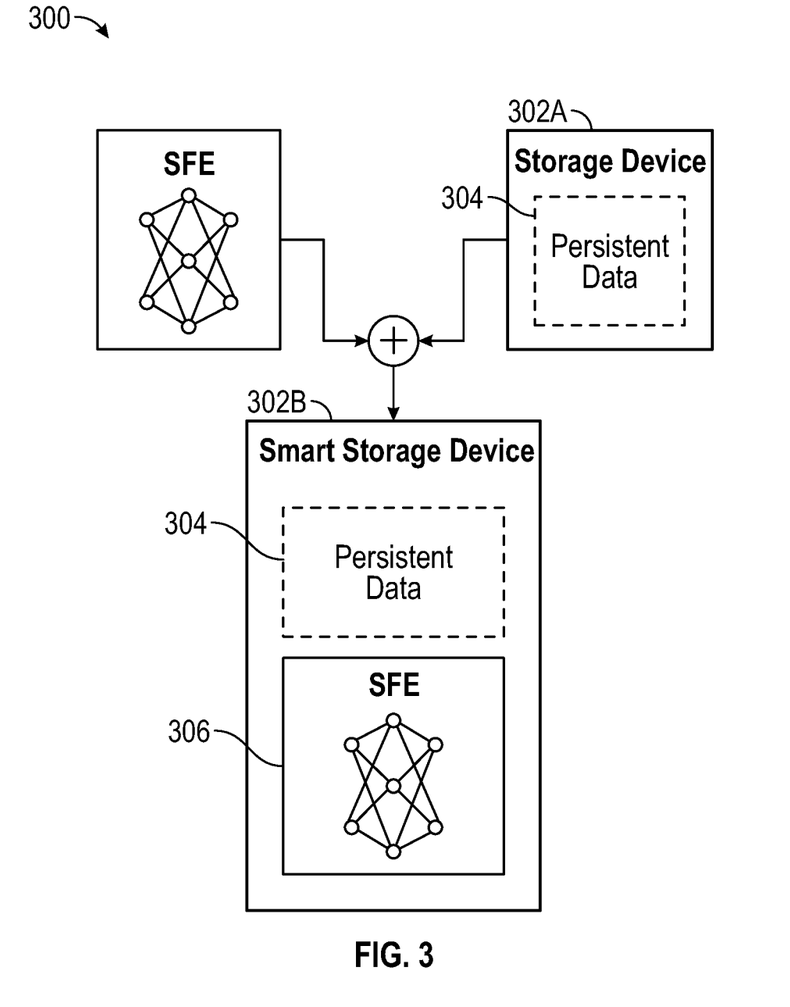
FIG. 3 is an example of combining a storage device with a neural network engine according to some embodiments.

Generally, some embodiments of systems and methods described herein improve memory chip architecture by processing data inside of the storage device. FIG. 3 is an example 300 of combining a storage device with a neural network engine to create an improved or enhanced (sometimes referred to as "smart") storage device according to some embodiments. A traditional storage device 302A can store persistent data 304 and the interface of the storage device 302A can send the data to a host for processing. Some embodiments of systems and methods described related to a smart storage device 302B. The smart storage device 302B can store the persistent data 304 and execute a neural network, such as a systolic flow engine 306, within the smart storage device 302B. The systolic flow engine is described in more detail in a patent application titled "Systolic Neural Network Engine Capable of Forward Propagation" (U.S. patent application Ser. No. 15/981,624, filed on May 16, 2018), and in a patent application titled "Reconfigurable Systolic Neural Network Engine" (U.S. patent application Ser. No. 16/233,968, filed on Dec. 27, 2018), the disclosures of each of which is hereby incorporated by reference in its entirety.

Accordingly, in some embodiments, the memory chip architecture can reduce or eliminate a bottleneck based on transferring data between the storage device and the DRAM (or another type of memory). Advantageously, data processing on the storage device can be scalable, with the ability to process large amounts of data.

Figure 4:
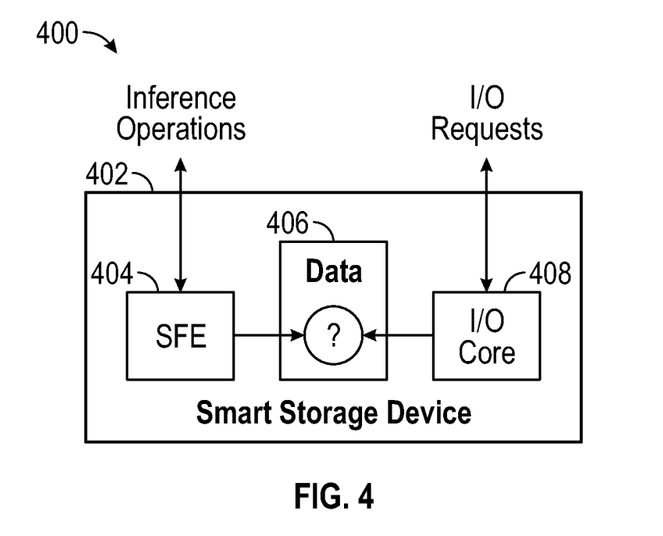
FIG. 4 is an example of communication between the storage device and a host according to some embodiments.

In the embodiment of FIG. 3, there can be conflicts between an I/O core (or controller or processor) and the neural network core (or controller or processor), such as in the scenario where the neural network requires a significant amount of time for data processing, but a host system expects fast I/O operations (such as a read or write operation) from the storage device. FIG. 4 is an example 400 of communication between a storage device and a host according to some embodiments. The smart storage device 402 can include a neural network, such as a systolic flow engine 404, and an I/O core 408 in communication with persistent memory 406. The systolic flow engine 404 can retrieve data from the persistent memory 406 and begin to process the data, such as via interference operations. However, while the data is being processed, a host system may request the same data being accessed. The I/O core 408 may wait for the systolic flow engine 404 to complete the data processing before retrieving and/or writing to the same data requested by the host system. Accordingly, the neural network processing time can severely degrade the performance of the I/O operation dramatically.

Data Streams Stored in Persistent Space

Figure 5:
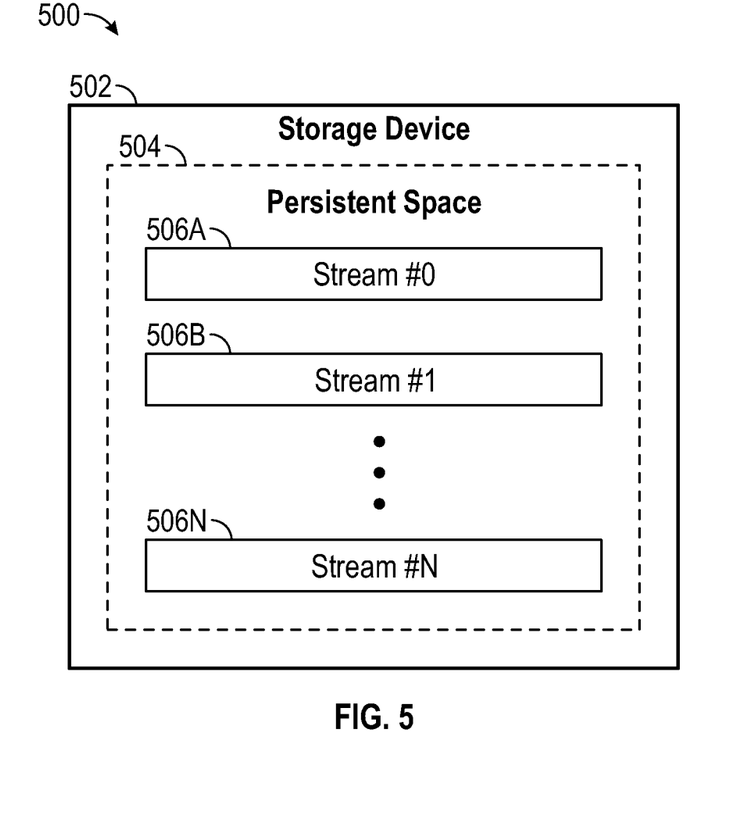
FIG. 5 illustrates an example of a storage device that includes a persistent space storing I/O requests in streams according to some embodiments.

FIG. 5 illustrates an example 500 of a storage device 502 that includes a persistent space 504 storing I/O requests in streams according to some embodiments. The storage device 502 can store I/O requests in streams, such as stream #0 506A, stream #1 506B, . . . stream #N 506N) within the persistent space 504. Persistent space can include one or more persistent memories, such as non-volatile solid-state memory, magnetic memory, or the like.

In some embodiments, the storage device 502 can receive a request to process a particular stream. In some embodiments, the persistent space 504 can store data persistently. The data can persist through a power off state of the storage device 502. The persistent space 504 can provide a data stream that can be used as an analogue of a file.

In some embodiments, the contiguous space that corresponds to streams can store data in the persistent space 504 and can be distinguished based on an identifier corresponding to the stream. As such, the streams can be advantageous for a machine learning process, such as a neural network, stored within the storage device because the machine learning process can apply any of the requests stored in the stream for data processing. The machine learning process can identify a stream's identifier, offset inside of the stream, and the machine learning process can process the data inside of the stream. Streams can be advantageous over storing objects because objects can include metadata that may not be needed for neural network processing. Typically, objects include object-based storing, resulting in significant restrictions on the applicability of neural networks. For example, certain neural networks may not be configured to exclude the metadata from the object data or receive as input the relevant data with the metadata, rendering the neural network inoperable. In some embodiments, the stream can store data without the metadata and/or only the relevant data for the neural network. The neural network can receive the relevant data as a byte stream from the contiguous space that corresponds to streams and can store data in the persistent space 504. Advantageously, such neural networks can be simplified in complexity by not having to be trained to differentiate between the metadata and the relevant data. Moreover, objects may or may not be stored contiguously, whereas a stream approach can enable contiguous storage.

The neural network can efficiently implement specialized algorithms for data processing. Artificial neural networks (or connectionist systems or machine learning models) can learn to perform certain tasks based on training data. Moreover, such training can occur without task-specific programming. For example, a neural network can learn to identify images that contain cats by analyzing training data of example images that have been manually labeled as "cat" or "no cat." The neural network can adjust its weightings in the nodes to identify cats in other images.

The neural network engine used by the disclosed embodiments can be configured to any type of neural network. The neural network engine can define a neural network based on one or more factors, including (1) the number of nodes in one layer, (2) the number of hidden layers, (3) the type of activation function, and/or (4) the matrix of weights for every connection between nodes of layers. In some embodiments, the neural network can be defined based on a functionality, and the neural network engine can retrieve a predefined neural network corresponding to the desired functionality.

Streams Stored as Contiguous Sequences

The file system can allocate some physical sectors of the memory to store files. However, a storage device can be fragmented, and the files may be broken into several pieces, stored in different areas as contiguous spaces accessible via logical block addresses ("LBA"), and may not be stored contiguously. In such cases, for reading and writing to the storage device, the host would use a number of logical block addresses to store and/or retrieve data.

Figure 6:
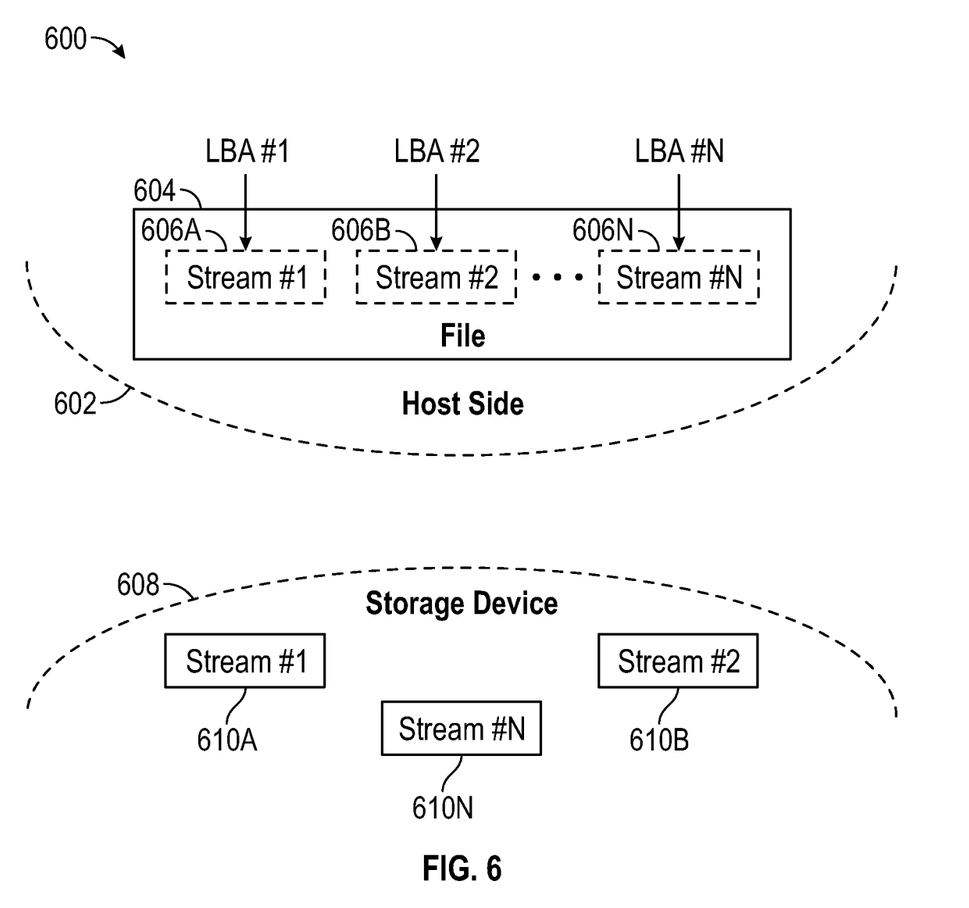
FIG. 6 illustrates an example of a file split into several extents and stored in contiguous sequences according to some embodiments.

In some embodiments, the data is stored as streams in a contiguous area of the smart storage device. FIG. 6 illustrates an example 600 of a file split into several extents and stored by the file system in contiguous sequences of physical memory units according to some embodiments. The Extent (or stream) #1 606A, Extent #2 606B, . . . Extent #N 606N (collectively referred to herein as extents 606) of a file 604 can be identified by a file system of the host a starting logical block address, such as LBA #1, LBA #2, LBA #3 and a length of each of the extents (or a common length in case of extents having the same length). The file system can update and/or access a file content via the logical block addresses.

In some embodiments, the host or host side 602 can request an inference operation of a neural network, such as a systolic flow engine, based on the stream's LBA and length. The host side 602 can send the start LBA number and the length of each extent that the host side 602 would like to process in the neural network. In other embodiments, the host side 602 can send the extent ID. The storage device 608 can receive the LBA number and lengths for each of the extents, can determine and/or configure the number of neural networks for processing the data, and process the streams by the neural networks on the storage device 608 side. Moreover, a stream-based approach of a contiguous sequence of physical memory units can provide an efficient way of processing data in a neural network on the storage device 608. Furthermore, a stream-based approach can enable in-memory neural network data processing for different file sizes, as well as files that change in size over time.

In some embodiments, the storage device 608 can implement the locking functions that enable consistency of the data representation in the stream for the neural network operations. Advantageously, even though the files can have various lengths and can change in size over time, the neural network core can still process data of a fixed size. As shown in the storage device 608, the file may not be stored in a contiguous sequence of physical memory units, but can be stored in a set of one or more storage device memory streams, such as Stream #1 610A, Stream #2 610B, Stream #N 610N (collectively referred to herein as storage device streams 610), that are distributed in different places in the storage device. Streams can be identified by a common identifier, which can be unique. Each of the storage device streams can include a contiguous sequence of physical memory storage units (such as cells, pages, sectors, etc.).

The storage device 608 can process neural network computations on the file 604 using the extents. Advantageously, the extent-based approach allows the storage device 608 to resolve conflicts between a neural network core and another core (e.g. core that processes I/O operations) because of the advantage of locking only the relevant file for the neural network and not the entire memory storage. Also, because each stream is contiguous, the neural network core can process multiple streams substantially simultaneously or substantially in parallel. This can increase efficiency of neural network processing.

Figure 7:
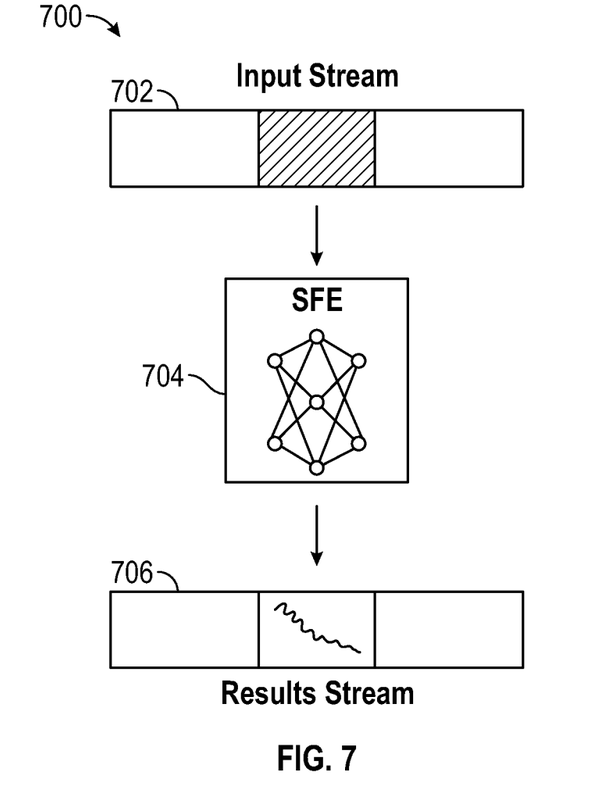
FIG. 7 illustrates an example of an input stream of data processed by the neural network according to some embodiments.

FIG. 7 illustrates an example 700 of an input stream of data processed by the neural network according to some embodiments. In some embodiments, the storage device can configure the neural network, such as by defining the type of neural network for processing of the data. The storage device can identify the appropriate input stream 702 based on a stream identifier. For example, the input stream 702 may include a picture 702 that is sent into a neural network, such as a systolic flow engine 704, that is trained to identify people in the picture. The systolic flow engine 704 may output an output stream 706 that provides an indication on whether a person was identified in the picture of the input stream 702.

Neural Network and I/O Core Architecture

Figure 8:
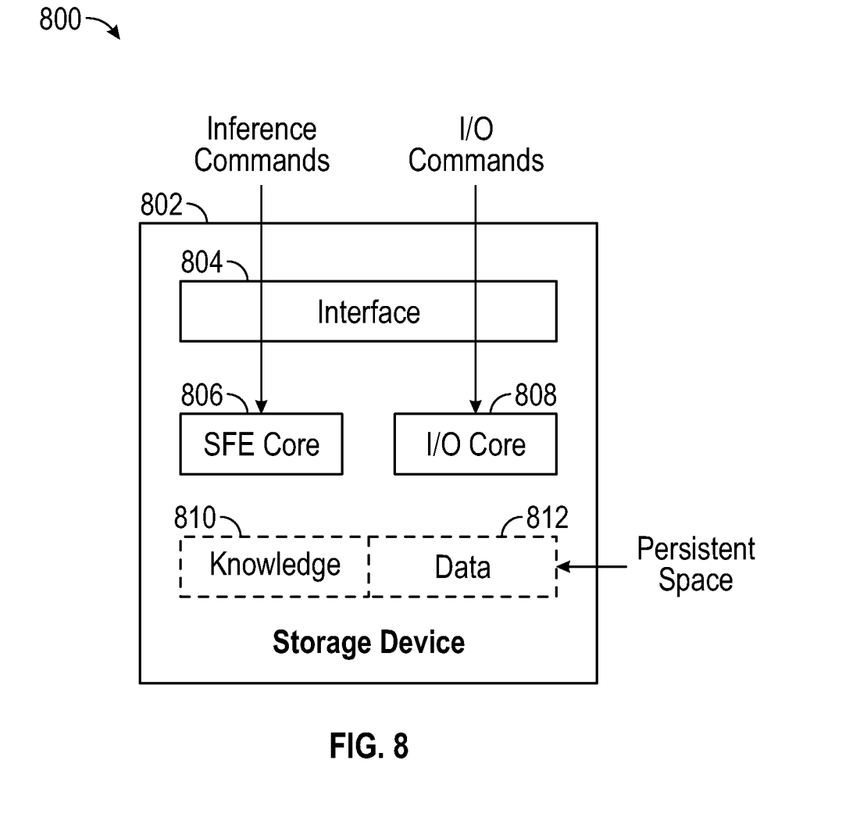
FIG. 8 illustrates an example of a multi-core storage device according to some embodiments.

FIG. 8 illustrates an example 800 of a multi-core smart storage device 802 according to some embodiments. In some embodiments, the storage device 802 can include a neural network core 806, such as a systolic flow engine ("SFE") core, and an I/O core 808. The neural network core 806 can receive inference (and/or training) commands from a host system via an interface 804, and/or process data through one or more neural networks. The I/O core 808 can receive the I/O commands from a host system via the interface 804.

In some embodiments, the neural network core 806 can copy the data 812 into a knowledge space 810 of the persistent space in order to perform neural network computations. Advantageously, creating the copy can free the I/O core 808 to perform I/O commands on the actual data 812 while the neural network core 806 is performing neural network computations in parallel or substantially in parallel. This can be useful if neural network computations take a prolonged period of time and/or if an I/O command is received from the host while neural network processing is being performed. Moreover, creating the copy allows for all neural network computations to be performed on a separate copy of the data, and not on a copy that can be modified by the I/O core 808. Moreover, the copying enables protection for the real data 812 in the event of an error (e.g. real data 812 becoming corrupted via the data processing in the neural network). In some embodiments, the storage device 802 can store the relevant streams for data processing into the knowledge 810 data space. In some embodiments, the output of the neural networks can be stored in the knowledge space 810 and/or data space 812 of the persistent space. Data can be stored, at least in the knowledge space 810, using the streams, as described herein.

In some embodiments, the neural network core 806 can configure one neural network to process data at a given time. In some embodiments, the neural network core 806 can configure a plurality of neural networks to process the same set of data at the same or substantially same time. For example, the neural network core 806 can configure a neural network to identify a person in the picture and another neural network that can identify a background location of the picture. The picture can be inputted into both neural networks for parallel or substantially parallel processing.

In some cases, the cores 806 and 808 can be implemented by different controllers or processors. For example, the I/O core 808 can be a separate core than the neural network core 806. The I/O core can have a dedicated persistent space of data 812 that is used for storing persistent data. The neural network core 806 can be an independent core, such as an ASIC, CPU, FPGA, with a dedicated persistent space of knowledge 810 data to execute training, inference and data processing.

In some embodiments, the I/O core 808 can communicate with the host without knowledge of the underlying data processing via the neural network. For example, the host can request the I/O core 808 to perform a particular operation on a set of data, such as a read/write request. The particular operation can be an inference operation of a neural network that may require substantial processing resources. The I/O core 808 can then store the data to the persistent space (as described herein). In some embodiments, the neural network core 806 can receive the input data from the host, configure the neural network to perform one or more inference operations, process the data through the neural network, and send the output data to the host. Moreover, the neural network core 806 can execute training and/or inference operations of the neural network in parallel or substantially in parallel with the other operations being performed by the I/O core 808.

In some embodiments, the storage device can lock the corresponding input data as the input data is pushed into the neural network. The I/O core doesn't need to wait for the neural network core to finish an inference operation because it only needs to lock the initial data for the time period of copying data from the data 812 to the knowledge area 810. The host can access the data without modification, such as a read operation.

In some embodiments, the neural network core can push the data into the neural network. The circuitry between the layers can include one or more memory cells to store the outputs of a previous layer as inputs to the next layer.

In some embodiments, data can be back-propagated through the layers of the persistent space for training purposes. For example, training data can be forward propagated through the neural network. Based on the output of the neural network, the neural network core can back propagate through each layer by increasing the weight for the nodes that contributed to the desired output and vice versa.

Inference Operation Execution without Copying Stream Data

Figure 9:
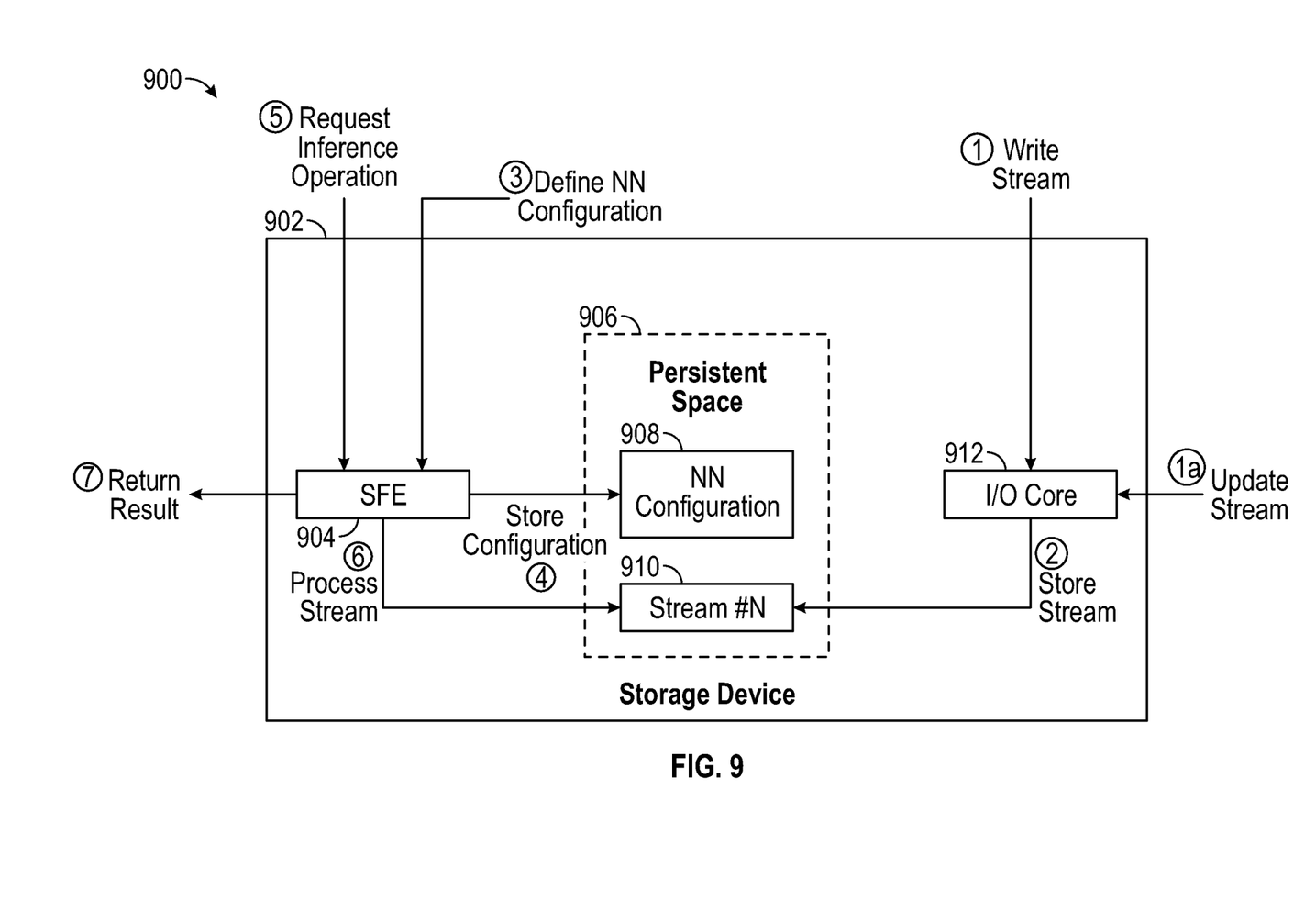
FIG. 9 illustrates an example of the execution of an inference operation on a neural network according to some embodiments.

FIG. 9 illustrates an example 900 of the execution of an inference operation on a neural network without copying stream data according to some embodiments. The illustrated process can be executed by any of the smart storage devices described herein in, such as for example the I/O core and the neural network core. In step 1, a host can send to a smart storage device 902 a request to write a stream of data into the memory. I/O core 912 can receive the request and at step 2 store the stream into persistent space 906 in accordance with a stream identifier 910.

In step 3, the storage device 902 can receive parameters to define a neural network configuration. In some embodiments, the neural network configuration is predefined, such as predefined during the manufacturing process. In other embodiments, the neural network can be configured and/or reconfigured based on certain parameters, such as a number of nodes, number of layers, set of weights for the nodes, type of functionality, and/or the like. In step 4, the storage device 902 can store the configuration for the neural network in a neural network configuration section 908 of the persistent space 906. As illustrated and described herein, the persistent space 906 can include one or more memory streams.

In step 5, the storage device 902 can receive a request for an inference operation. The neural network core, such as the systolic flow engine 904, can process the one or more stream of data at step 6, and return the result(s) of the processing at step 7.

In some cases, the I/O core 912 may receive a request to update an existing stream at step 1A during a neural network operation. If the I/O core 912 updates the same stream as the stream being processed by the neural network, there may be issues with the neural network not processing a static set of data, but data that is being changed while processing. This can result in errors in the inputs of the neural network and/or change the outputs of the neural network. For example, while the neural network begins processing a picture of a car stored in a stream, the I/O core receives a request to switch the same picture of the car with a picture of a building, the neural network may not be processing either a car or building. Instead, the neural network may be processing a hybrid mix of the car and building picture, resulting in an erroneous result.

Inference Operation Execution with Copying Stream Data

Figure 10:
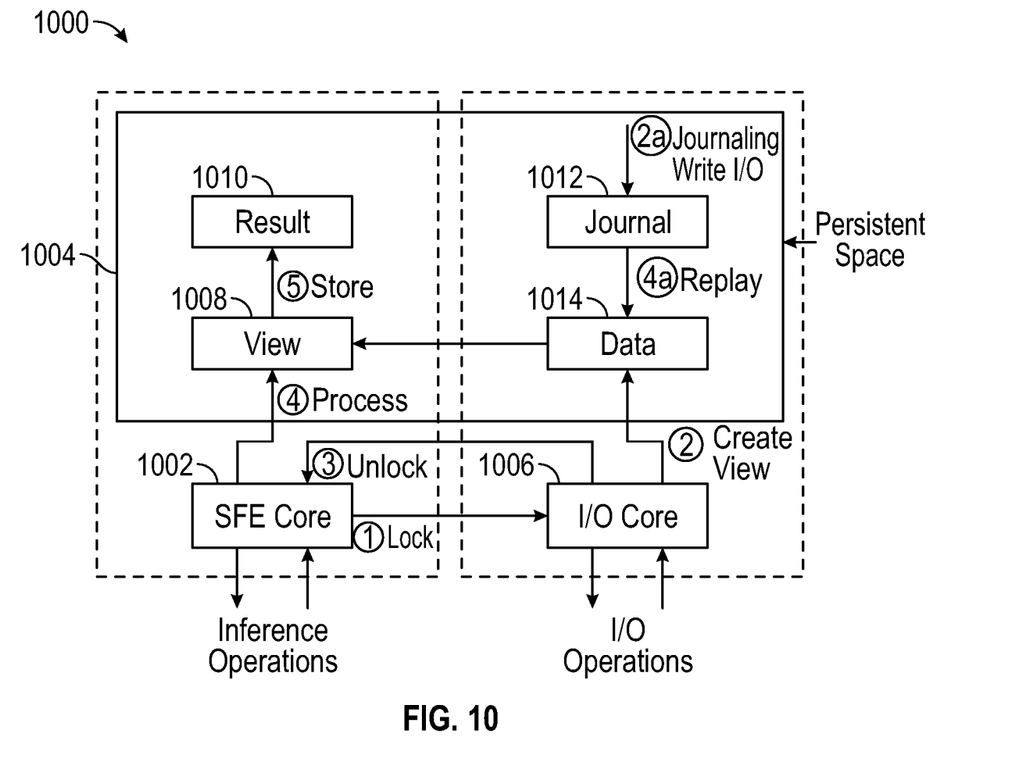
FIG. 10 illustrates an example of the execution of an inference operation on a neural network with copying stream data according to some embodiments.

These problems can be addressed as shown in FIG. 10, which illustrates an example 1000 of the execution of an inference operation on a neural network with copying stream data according to some embodiments. The illustrated process can be executed by any of the smart storage devices described herein in, such as for example the I/O core and the neural network core. In step 1, the neural network core 1002, such as the systolic flow engine core, can communicate with a subsystem to implement a lock request. The neural network core 1002 and the I/O core 1006 can interact with the subsystem to access data in the persistent space.

In step 2, the I/O core can create a view (or a copy) of the relevant stream of data, by sending the copy of the data 1014 to the view 1008, all within the persistent space 1004. In step 3, the I/O core 1006 can indicate to the neural network core 1002 that the data is now unlocked. In step 4, the neural network core 1002 can process the data stored in the view 1008 through a neural network and can store the result in step 5 in a result space 1010.

In some embodiments, the stream that is being copied from the data 1014 to the view 1008 can be locked/unlocked individually during the copying. In some embodiments, all of the streams needed for the neural network can be locked at once, copied over, and unlocked at the same time. In some embodiments, the entire data storage 1014 can be locked, relevant streams copied, and the entire data 1014 unlocked.

In step 2A, an I/O operation and/or other operation that is received while the data is locked can be stored in a journal 1012. After the data is unlocked in step 3, in step 4A, the requests stored in the journal 1012 can be replayed and performed on the data 1014. Advantageously, the neural network can process the data in the view 1008 without affecting I/O operations that need to be performed on the data 1014 and/or without pausing to wait for the I/O operations to be completed.

Figure 11:
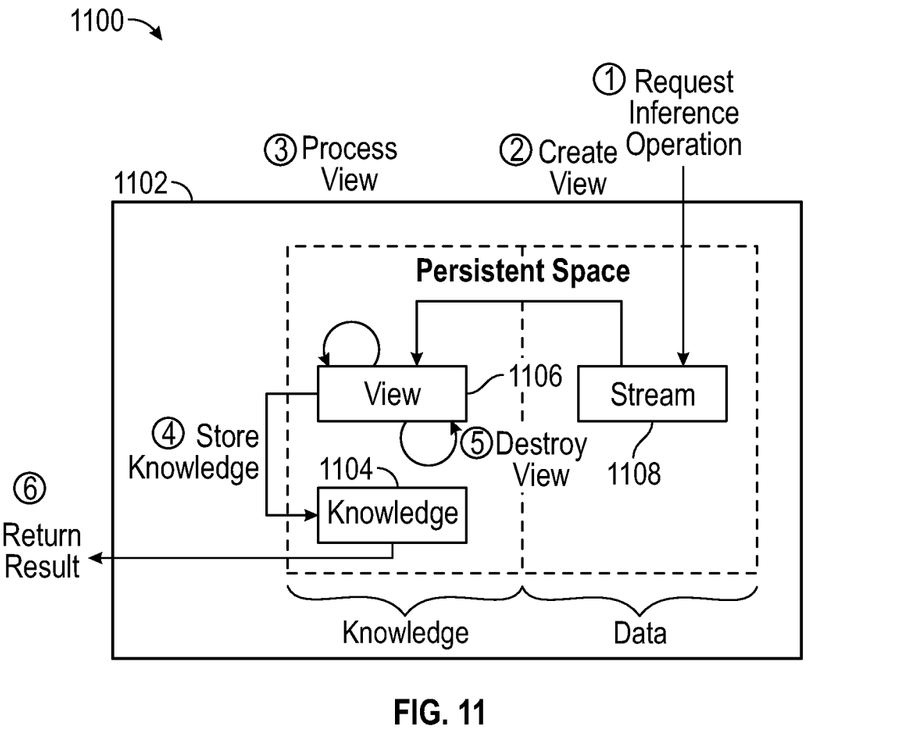
FIG. 11 illustrates an example of data copy management according to some embodiments.

FIG. 11 illustrates an example 1100 of data copy management according to some embodiments. In step 1, the data storage device 1102 (which can be a smart storage device of any of the disclosed embodiments) can receive a request for a training or interference operation from a host device. In step 2, the stream data 1108 in the persistent space can be copied to a view 1106 portion of the persistent space. In step 3, the data storage device can process the isolated view data in a neural network. After the neural network completes processing, the data storage device can store the results (e.g. knowledge) into a knowledge portion 1104 of the persistent space in step 4, and in step 5 destroy the copy of the data. In step 6, the data storage device can transmit the result (e.g. knowledge) of the neural network to the host device.

Other Variations

Any of the embodiments disclosed herein can be used with any of the concepts disclosed in co-pending U.S. patent application Ser. No. 16/363,661, filed on Mar. 25, 2019, and titled "ENHANCED MEMORY DEVICE ARCHITECTURE FOR MACHINE LEARNING".

Those skilled in the art will appreciate that in some embodiments additional system components can be utilized, and disclosed system components can be combined or omitted. Although some embodiments describe video data transmission, disclosed systems and methods can be used for transmission of any type of data. In addition, although some embodiments utilize erasure coding, any suitable error correction schemes can be used. The actual steps taken in the disclosed processes may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (such as, DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device configured to perform neural network computations, the device comprising:
   a non-volatile memory comprising a first memory region configured to store data provided by a host system and a second memory region configured to store data related to neural network computations; and
   at least one controller configured to:
      store data in the first memory region and retrieve data from the first memory region in response to at least one data transfer command received from the host system;
      receive, from the host system, a request to perform an operation on data stored in the first memory region;
      in response to determining that the data stored in the first memory region is in a locked state, store the request in a journal to defer performance of the operation on the data stored in the first memory region;
      copy the first memory region to the second memory region;
      unlock the first memory region; and
      perform neural network computations on copied data in the second memory region while performing the operation on the data stored in the first memory region using the request stored in the journal.

2. The device of claim 1, wherein the second memory region is configured to store a plurality of memory streams, each stream including a contiguous set of physical memory storage units of the non-volatile memory, and wherein the at least one controller is further configured to perform neural network computations on the plurality of memory streams.

3. The device of claim 2, wherein the at least one controller is further configured to identify each memory stream of the plurality of memory streams by a common identifier.

4. The device of claim 2, wherein the plurality of memory streams comprises a first memory stream and a second memory stream.

5. The device of claim 2, wherein the at least one controller is further configured to store input data for neural network computations in at least one memory stream of the plurality of memory stream.

6. The device of claim 2, wherein the plurality of memory streams comprises at least one input memory stream and at least one output memory stream, and wherein the at least one controller is further configured to perform neural network computations on data stored in the at least one input memory stream and store a result of the neural network computations in the at least one output memory stream.

7. The device of claim 6, wherein the at least one controller is further configured to receive from the at least one output memory stream the result of the neural network computations and provide the result to the host system.

8. The device of claim 2, wherein the at least one controller comprises a plurality of processor cores configured to process a plurality of memory streams substantially concurrently.

9. The device of claim 1, wherein the at least one controller includes an I/O core and a neural network core.

10. A method for performing neural network computations within a data storage device, the method comprising, by at least one controller of the data storage device:
   receiving, from a host system, a first request to perform processing of data stored in a memory region of a non-volatile memory of the data storage device;
   locking the memory region of the non-volatile memory;
   receiving, from the host system, a second request to perform an operation on data stored in the memory region of the non-volatile memory;
   in response to determining that the memory region is in a locked state, storing the second request in a journal to defer performance of the operation in the memory region;
   copying of the memory region of the non-volatile memory;
   unlocking the memory region of the non-volatile memory;
   initiating processing of the data by applying a neural network on copied data of the copied memory region; and
   in the unlocked memory region, performing the operation for the second request on the data stored in the memory region using the second request stored in the journal while the processing of the copied data of the copied memory region is performed by the neural network.

11. The method of claim 10, wherein the neural network includes a systolic flow engine.

12. The method of claim 10, wherein neural network parameters are stored in the non-volatile memory, and the processing of the data via the neural network occurs within the data storage device.

13. The method of claim 10, wherein the operation includes a write operation.

14. The method of claim 10, wherein the method further comprises, by the at least one controller:
in response to determining that the processing of the data via the neural network has been completed, deleting the copied memory region.

15. A data storage device configured to perform neural network computations, the device comprising:
a non-volatile memory comprising a first memory region configured to store data provided by a host system and a second memory region configured to store data related to neural network computations;
a first controller configured to:
receive, from the host system, a first request to perform analysis of data stored in the first memory region;
set a locked state for the data of the first memory region; and
copy the data stored in the first memory region to the second memory region; and
a second controller configured to:
receive, from the host system, a second request to perform an operation on data stored in the first memory region;
in response to determining that the data stored in the first memory region is in the locked state, store the second request in a journal to defer performance of the operation on the data stored in the first memory region;
determine that the data stored in the first memory region is in an unlocked state; and
in response to determining that the data stored in the first memory region is in the unlocked state, perform the operation for the second request on the data stored in the unlocked first memory region using the second request stored in the journal while processing of copied data in the second memory region is performed by the neural network.

16. The device of claim 15, wherein the journal is configured to prevent writing to the first memory region.

17. The storage device of claim 15, wherein the first controller is further configured to:
receive an additional request to perform analysis of data stored in the first memory region while the data stored in the first memory region is in the locked state; and
copy the data stored in the first memory region into a third memory region without waiting for the data stored in the first memory region to be in an unlocked state.

18. The device of claim 15, wherein the first controller is further configured to retrieve from an output memory stream the result of the neural network computations and provide the result to the host system, the output memory stream comprising a contiguous set of physical memory storage units of the second memory region of the non-volatile memory.

19. The device of claim 15, wherein the first controller comprises a plurality of processing cores configured to process a plurality of memory streams substantially concurrently.

* * * * *